(No Model.) 4 Sheets—Sheet 1.
J. H. LUBBERS.
MANUFACTURE OF WIRE GLASS AND APPARATUS THEREFOR.
No. 527,754. Patented Oct. 16, 1894.
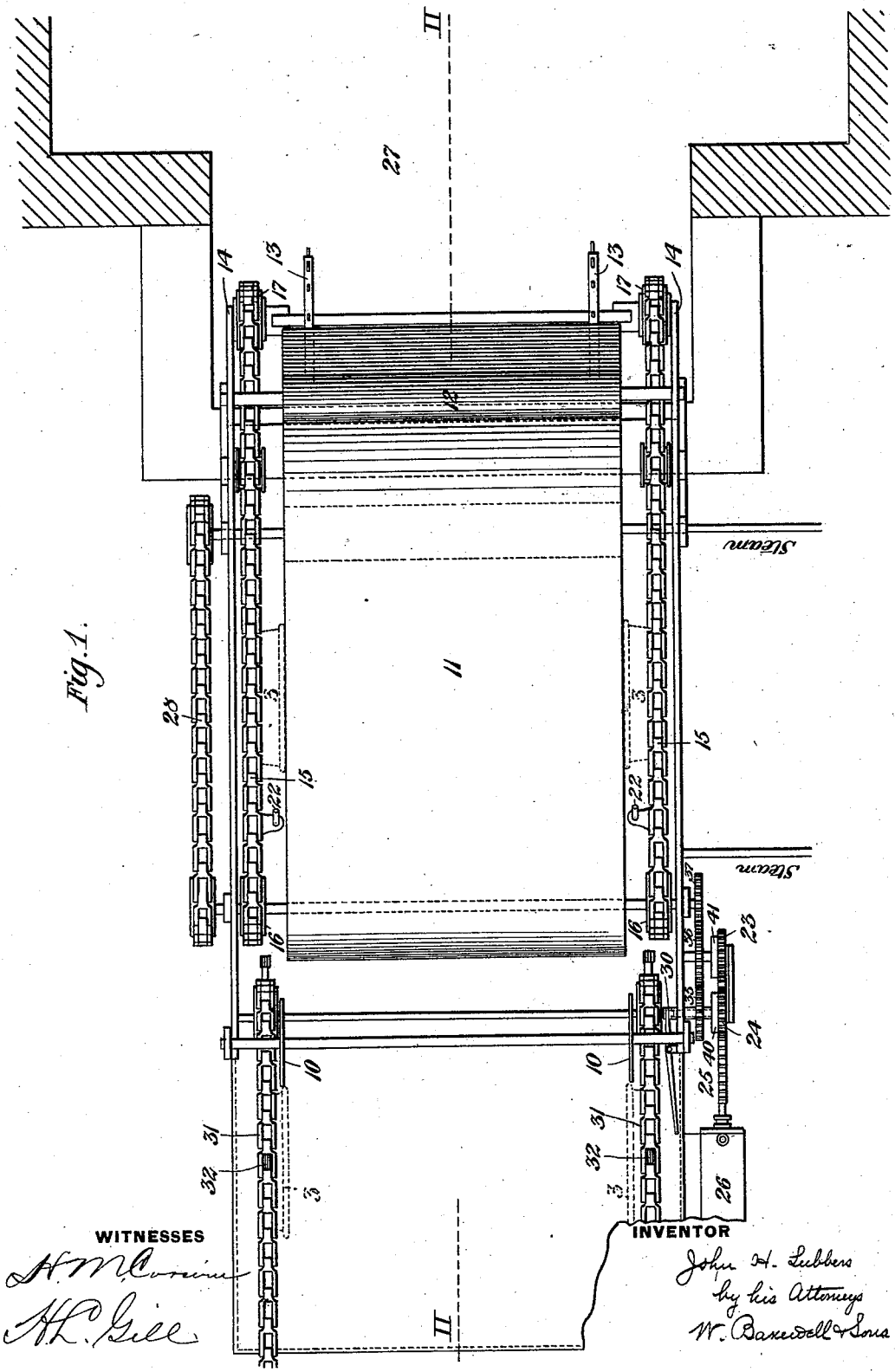

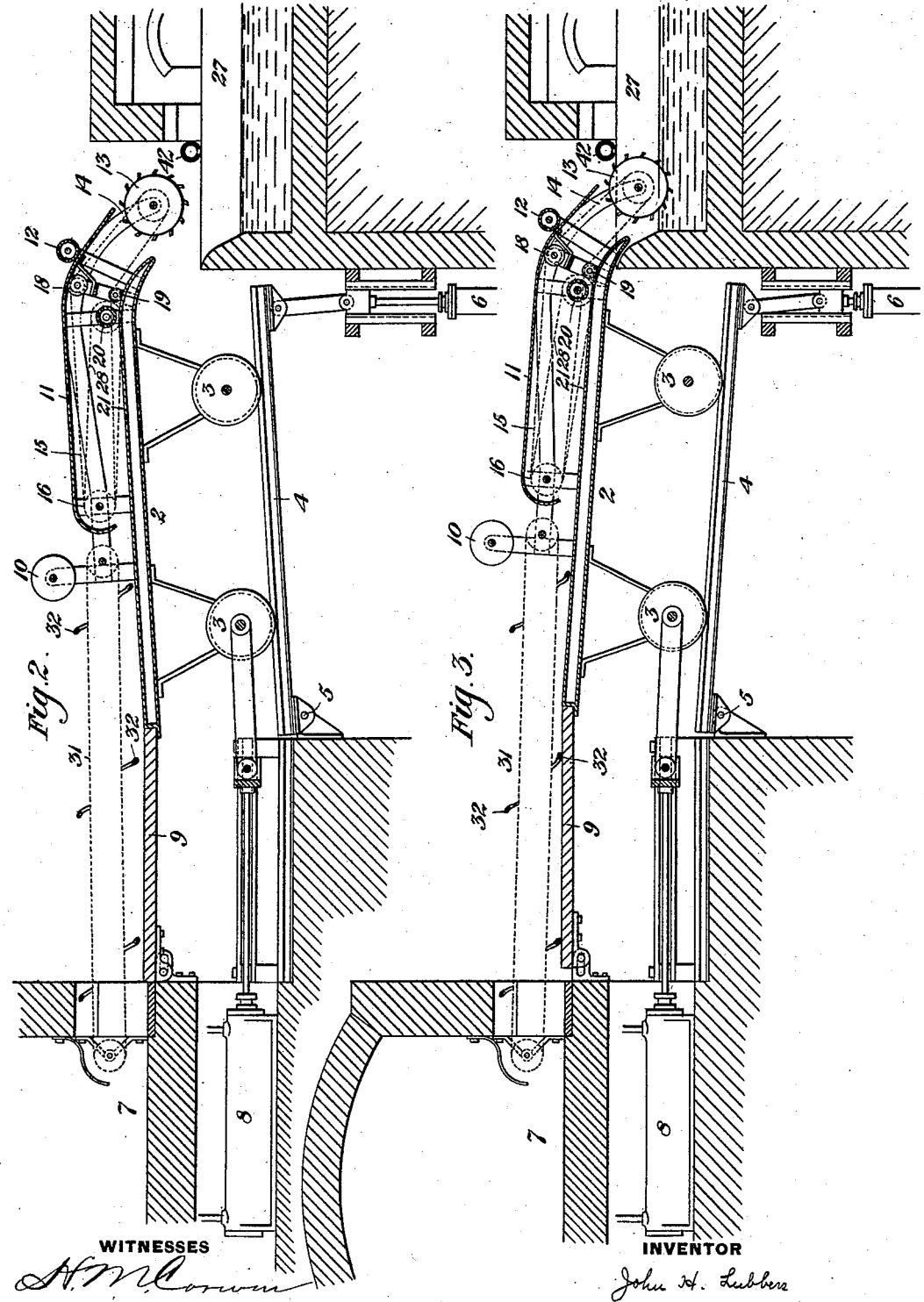

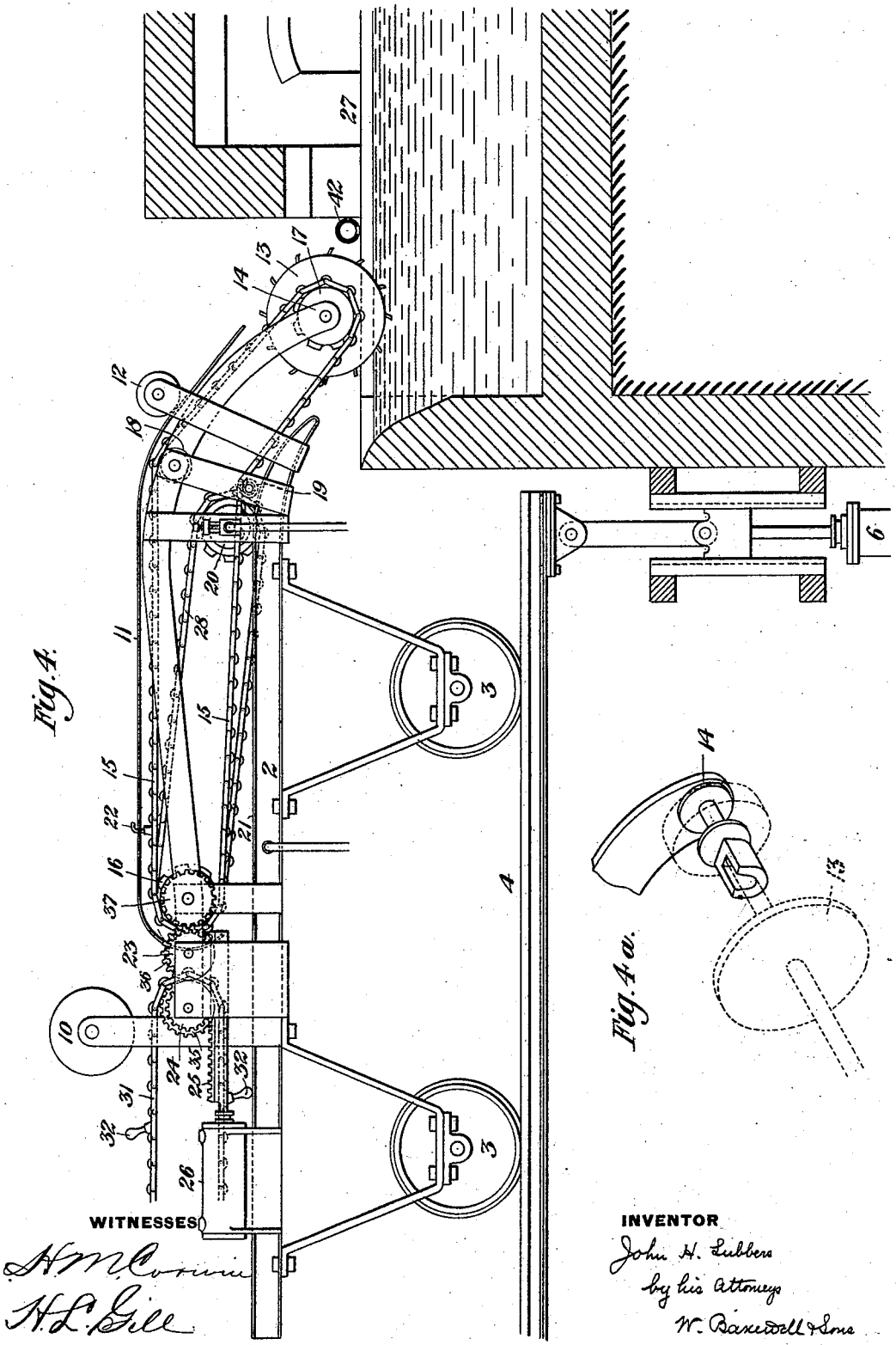

(No Model.) 4 Sheets—Sheet 4.
J. H. LUBBERS.
MANUFACTURE OF WIRE GLASS AND APPARATUS THEREFOR.
No. 527,754. Patented Oct. 16, 1894.
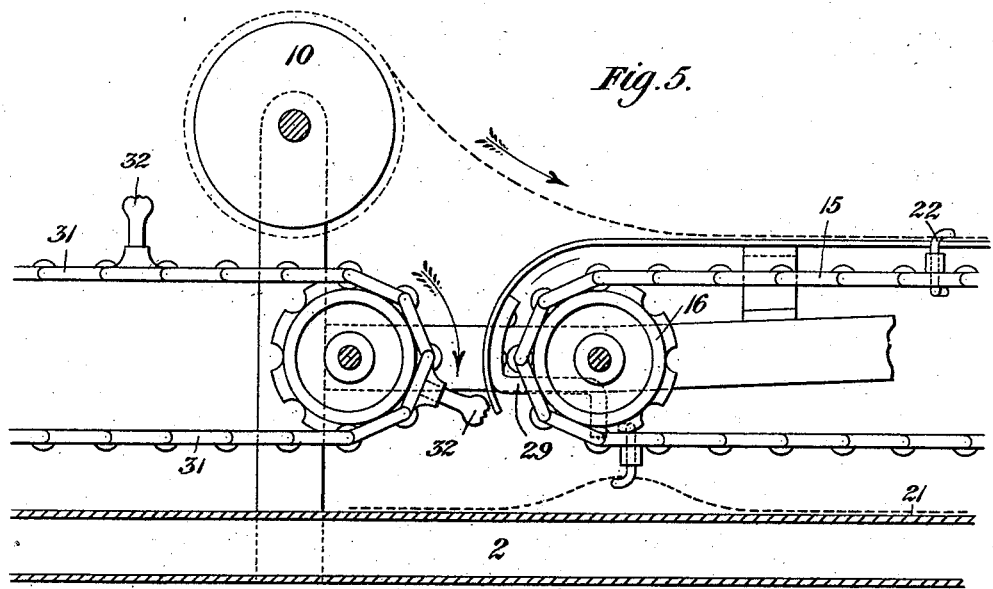
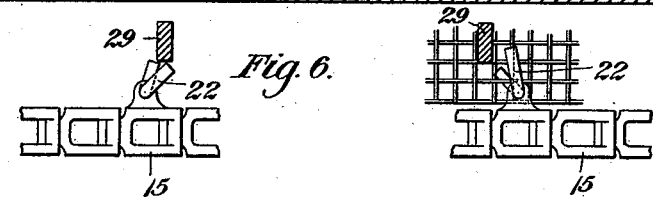
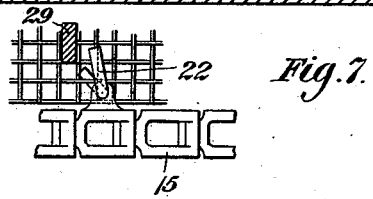
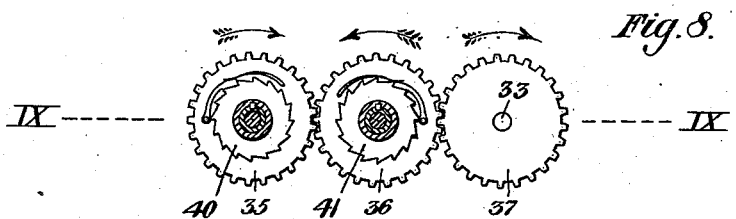
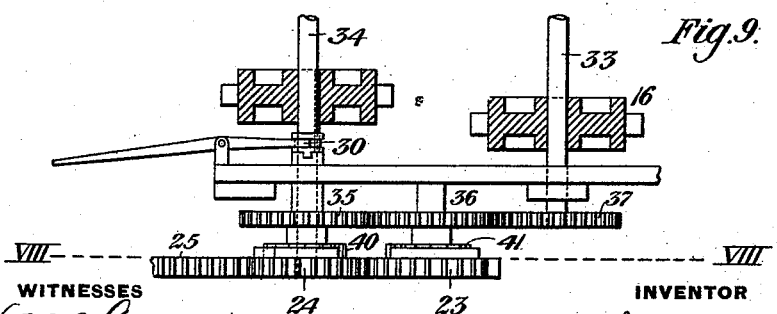
WITNESSES
INVENTOR
John H. Lubbers
by his Attorneys
W. Bakewell + Sons
THE NORRIS PETERS CO., PHOTO-LITHO., WASHINGTON, D. C.

UNITED STATES PATENT OFFICE.

JOHN H. LUBBERS, OF NEW KENSINGTON, ASSIGNOR OF ONE-HALF TO RICHARD E. WOODS, OF PITTSBURG, PENNSYLVANIA.

MANUFACTURE OF WIRE-GLASS AND APPARATUS THEREFOR.

SPECIFICATION forming part of Letters Patent No. 527,754, dated October 16, 1894.

Application filed March 23, 1894. Serial No. 504,851. (No model.)

*To all whom it may concern:*

Be it it known that I, JOHN H. LUBBERS, of New Kensington, in the county of Westmoreland and State of Pennsylvania, have invented a new and useful Improvement in the Manufacture of Wire-Glass and Apparatus Therefor, of which the following is a full, clear, and exact description.

My invention relates to a novel method of making wire glass in which wire fabric is embedded in a sheet of glass in order to strengthen it and to improve it for use in skylights, &c.

The invention consists in applying the glass to the fabric by dipping the fabric in the molton glass so that the glass shall adhere thereto, and it also consists in other subsequent operations to which the dipped fabric may be subjected, and in improved apparatus for the practice of the method above stated. By means of this method I am enabled to carry on the manufacture continuously and much more rapidly and with better results than have been possible heretofore.

My improved apparatus is illustrated in the accompanying drawings, Figure 1 of which shows it in plan view. Fig. 2 is a vertical longitudinal section on the line II—II of Fig. 1, showing the glass-carrying table elevated above the tank. Fig. 3 is a similar view, showing the table lowered, so that the parts shall be in position for drawing the wire fabric through the molten glass in a melting-tank. Fig. 4 is a view similar to Fig. 2, but on a larger scale, showing the parts of the apparatus in detail, the table being in position intermediate between the positions shown in Figs. 2 and 3, and illustrating the operation of the apparatus when the glass-melting tank is nearly full. Fig. 4ª is a detail view showing in perspective one of the removable bearings of the wheels 13. Fig. 5 is a detail view on a larger scale, illustrating the transfer of the dipped fabric from the mechanism which feeds it into the tank to the mechanism by which it is conveyed to the annealing leers. Figs. 6 and 7 are detail views, showing the mechanism by which the dipped fabric is freed from the feeding mechanism; and Figs. 8 and 9 are detail views of the devices which I prefer to use for transferring motion to the parts of the apparatus, Fig. 8 being a sectional side elevation, the section plane being on the line VIII—VIII of Fig. 9, and Fig. 9 being a horizontal section on the line IX—IX of Fig. 8.

The feeding mechanism by which the wire fabric is fed to the molten glass is preferably mounted upon a movable carriage or table 2, whose wheels 3 ride upon a vertically movable platform 4 which may be hinged at 5 and adapted to be raised and lowered by connection with a vertically acting cylinder 6.

7 is the mouth of an annealing leer, and 8 is a cylinder connected with the carriage 2 and adapted to move it back and forth. When the carriage is in its most advanced position, a plate 9, which is preferably hinged to the front of the leer, is laid in a horizontal position between the leer and the table 2 so as to form a continuation of said table for the conveyance of the glass sheets to the leer.

10 is a reel mounted on the table 2 and carrying a coil of the wire fabric which is to be dipped into the glass. This fabric passes from the reel over a plate 11 and under a pressure roller 12 to feeding wheels 13 which are journaled removably in arms 14 at the end of the table (Fig. 4ª) and have at their peripheries teeth or projections adapted to engage the meshes of the wire fabric and to keep the wire fabric from sagging in the middle.

The fabric is drawn from the reel by means of endless sprocket chains 15, which pass around sprocket wheels 16, 17, journaled respectively at the rear end of the table and at the ends of the arms 14. These chains pass over guide wheels 18 and 19, and under the journals of a pressure-roller 20, which is mounted in vertically adjustable bearings above a plate 21, which forms the bed of the table 2, and is preferably made hollow so that it can be heated by passage of a current of steam. The pressure roller 20 is also preferably hollow and is heated by steam introduced through the journals. The endless chains 15 are provided with two or more hooks 22, which project vertically from arms which extend laterally from the links of the chain so as to clear the supporting wheels 18 and 19, and these hooks are swiveled so that they may be turned as hereinafter explained to disengage them from the meshes of the wire fabric.

The sprocket-wheels 16 are driven by gearing 23, 24, connected with a toothed portion or rack of a reciprocating piston 25 actuated by a cylinder 26 or other suitable motor, and preferably constructed as hereinafter explained, so that each stroke of the piston forward or back shall produce motion of the sprocket chain in a single direction.

The purpose of providing the wheels 13 with removable bearings is that they can be easily removed and substituted by other wheels in case they should be unduly heated by proximity to the molten glass. Such removal of the wheels and any repairs which may be necessary to be made to the machine can easily be effected by retracting the carriage on its track.

The operation is as follows:—To bring the parts into operative position, the carriage having been advanced into the position shown in Fig. 2, the platform 4 is lowered, as shown in Figs. 3 and 4, so as to bring the wheels 13 into the glass in the melting tank 27, and the end of the wire fabric from the reel 10 is engaged with the hooks 22 on the sprocket chains 15. These chains are then driven and draw the fabric forward over the table 11, under the roller 12, around the wheels 13, and thence under the roller 20, which is driven by sprocket-chains 28. As the wire fabric passes around the wheels 13, it is immersed in the glass in the tank 27, and a film of glass adheres thereto, and as the glass-covered fabric passes under the heated roller 20, the pressure exerted thereon by the roller makes the coating of glass of regular thickness, and prevents the formation of irregular lumps and ridges. If desired to dip the fabric again in the glass, it may be carried around a second time by the endless chain 15 passing over the rear end of the table, and thence following the course above described; but after the coating of the glass has been completed satisfactorily, stops 29 at the rear end of the table are moved into such position that they shall engage the hooks 22 and turn them on their axes so as to release the coated fabric, and then by means of a clutch mechanism 30, sprocket-chains 31 are put into gear with the driving mechanism 25, 26. These sprocket-chains 31 extend over the plates 21 and 9, and have projecting corrugated fingers 32 which engage the margins of the coated wire fabric and draw it along over the plate 9, feeding it into the annealing oven 7.

The thickness of coating of the glass upon the fabric may be controlled readily by regulating the temperature and therefore the consistency of the glass in the melting-tank, for if the glass be cooled somewhat so that it shall be of thicker consistency a thicker layer of it will adhere to the fabric than if it were hotter and more liquid. For the purpose of regulating the temperature of the glass, I employ a heating device such as a gas or vapor burner 42, which is situated over the glass near the gathering end of the tank so that by varying the intensity of the flame by this burner the temperature of the glass may be conveniently and sufficiently regulated for the purpose indicated above. The thickness of the coating will also depend somewhat upon the size of the mesh of the wire fabric to be coated, for a thicker coating will adhere more readily to a fine than to a fabric of coarser mesh. The thickness of the coating also depends somewhat upon the rate of speed at which the fabric is carried through the glass, for the slower the motion of the fabric the thicker will be the coating.

The apparatus above described provides means for embedding several layers of wire fabric, for after the glass has been carried once around the table as above described, a second sheet of fabric may be attached to the hooks on the chain and then carried around with the first, being in its passage coated with the molten glass and submitted thereby to the first sheet.

In place of wire fabric, I may use perforated sheet metal, or metal in other forms.

In Figs. 8 and 9 I show the means which I prefer to use for transferring as a continuous motion in a single direction to the sprocket-wheels of the chains 15 and 31 the reciprocating motion of the toothed plunger 25. For this purpose the shafts 33 and 34 of the sprocket wheels which drive the chains 15 and 31 are connected by gear-wheels 35, 36, and 37, and to the axes of the gear-wheels 35 and 36 are applied pinions 24 and 23, which are set loosely on their axes but are connected therewith by pawls and ratchets 40 and 41, the pawls of the respective ratchets being oppositely directed so that as the pinions are oscillated by reciprocation of the rack 25 which is in gear therewith, on the forward motion of the rack transmits rotary motion to the gear-wheel 35 or 36, while the other slips loosely over its axis, and on the reverse motion of the rack these operations are reversed, the first named pinion slipping loosely on its axis, and the other transmitting rotary motion through its pawl and ratchet. The consequence is that each stroke of the rack drives the chains which are in gear therewith, so that a continuous and not an interrupted motion is transmitted thereto.

My method of coating wire fabric above described may be practiced with apparatus of many types, and is not dependent upon any peculiar means for carrying it into effect; and as to the apparatus which I have described, its construction and the relative arrangement and form of its parts may be varied within the scope of the invention as defined in the claims, since

What I claim is—

1. The method of making wire glass, which consists in dipping wire fabric into a body of molten glass, and causing the glass to adhere thereto; substantially as described.

2. The method of making wire glass, which consists in dipping wire fabric into a body of molten glass, causing the glass to adhere thereto, and regulating the thickness of the glass coating by regulating the temperature of the glass into which the fabric is dipped; substantially as described.

3. The method of making wire glass, which consists in dipping wire fabric into a body of molten glass and causing the glass to adhere thereto, and then equalizing the glass coating by pressure; substantially as described.

4. The method of making wire glass, which consists in dipping wire fabric into a body of molten glass, causing the glass to adhere thereto, and then equalizing the glass coating by pressure between heated surfaces; substantially as described.

5. Apparatus for making wire glass, consisting in a carrier arranged in proximity to a receptacle for molten glass and adapted to carry wire fabric through the glass; substantially as described.

6. Apparatus for making wire glass consisting in a carrier arranged in proximity to a receptacle for molten glass and adapted to carry wire fabric through the glass, and a pressure roller which bears on the fabric after it has come from the glass; substantially as described.

7. Apparatus for making wire glass consisting in an endless chain carrier arranged in proximity to a receptacle for molten glass and adapted to carry wire fabric through the glass; substantially as described.

8. Apparatus for making wire glass, consisting in an endless-chain carrier arranged in proximity to a receptacle for molten glass and adapted to carry wire fabric through the glass, and guide-wheels at the position of the glass around which the fabric passes; substantially as described.

9. Apparatus for making wire glass, consisting in an endless-chain carrier arranged in proximity to a receptacle for molten glass and adapted to carry wire fabric through the glass, and guide-wheels at the position of the glass around which the fabric passes, said guide wheels being journaled removably in their bearings; substantially as described.

10. Apparatus for making wire glass, consisting in an endless chain carrier arranged in proximity to a receptacle for molten glass and adapted to carry wire fabric through the glass, said carrier having projections adapted to engage the fabric; substantially as described.

11. Apparatus for making wire glass, consisting in an endless chain carrier arranged in proximity to a receptacle for molten glass and adapted to carry wire fabric through the glass, said carrier having projections adapted to engage the fabric, means for disengaging the carrier from the coated fabric at the end of its travel, and a second carrier adapted to engage the coated fabric and to carry it forward; substantially as described.

12. Apparatus for making wire glass, consisting in an endless-chain carrier arranged in proximity to a receptacle for molten glass and adapted to carry wire fabric through the glass, and a reel from which the fabric is drawn; substantially as described.

13. Apparatus for making wire glass, consisting in a carrier arranged in proximity to a receptacle for molten glass and adapted to carry wire fabric through the glass, an annealing oven in proximity to the carrier, and mechanism adapted to receive the coated fabric from the carrier and to convey it to the annealing oven; substantially as described.

14. Apparatus for making wire glass, consisting in a carrier arranged in proximity to a receptacle for molten glass and adapted to carry wire fabric through the glass, said carrier being mounted on a vertically movable support and adapted to be raised and lowered thereby so as to conform to the level of glass in the receptacle; substantially as described.

15. Apparatus for making wire glass consisting in a carrier arranged in proximity to a receptacle for molten glass and adapted to carry wire fabric through the glass, said carrier being vertically movable; substantially as described.

16. Apparatus for making wire glass, consisting in a carrier arranged in proximity to a receptacle for molten glass and adapted to carry wire fabric through the glass, said carrier being mounted on a vertically movable support and adapted to be raised and lowered thereby so as to conform to the level of the glass in the receptacle, and said support being also movable to and from the receptacle; substantially as described.

17. In apparatus for making wire glass, the combination of an endless chain carrier adapted to carry wire fabric through the glass in a receptacle, a second carrier leading from the first, and means for automatically disengaging the coated fabric from the first carrier and causing it to be engaged by the second; substantially as described.

18. A carrier for glass, the same consisting of a table over which the glass is moved, and an endless chain having projections adapted to engage the glass frictionally on the table and to carry it along over the same; substantially as described.

In testimony whereof I have hereunto set my hand.

JOHN H. LUBBERS.

Witnesses:
F. E. GAITHER,
H. M. CORWIN.